(12) United States Patent
Li et al.

(10) Patent No.: US 12,348,729 B2
(45) Date of Patent: Jul. 1, 2025

(54) DETERMINATION OF SAMPLE ADAPTIVE OFFSET MODE OF CODING TREE BLOCK

(71) Applicant: Shanghai Bilibili Technology Co., Ltd., Shanghai (CN)

(72) Inventors: Xiaobo Li, Shanghai (CN); Tianxiao Ye, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 112 days.

(21) Appl. No.: 18/209,715

(22) Filed: Jun. 14, 2023

(65) Prior Publication Data

US 2023/0328253 A1    Oct. 12, 2023

Related U.S. Application Data

(63) Continuation of application No. PCT/CN2022/072844, filed on Jan. 20, 2022.

(30) Foreign Application Priority Data

Mar. 17, 2021   (CN) .......................... 202110283711.4

(51) Int. Cl.
*H04N 19/137*   (2014.01)
*H04N 19/105*   (2014.01)
(Continued)

(52) U.S. Cl.
CPC ......... *H04N 19/137* (2014.11); *H04N 19/105* (2014.11); *H04N 19/176* (2014.11); *H04N 19/1883* (2014.11)

(58) Field of Classification Search
CPC .. H04N 19/137; H04N 19/105; H04N 19/176; H04N 19/1883
See application file for complete search history.

(56) References Cited

U.S. PATENT DOCUMENTS

2012/0262592 A1* 10/2012 Rabii ................. H04N 5/145
                                                      348/208.16
2013/0051454 A1*  2/2013 Sze .................... H04N 19/82
                                                      375/E7.126

(Continued)

FOREIGN PATENT DOCUMENTS

CN    106131554 A    11/2016
CN    107343199 A    11/2017

(Continued)

OTHER PUBLICATIONS

"High Efficiency Video Coding (HEVC) Test Model 16 (HM 16) Encoder Description Update 14", 131. MPEG Meeting; Jun. 29, 2020-Jul. 3, 2020; Online; (Motion Picture Expert Group or ISO/IEC JTC1/SC29/WG11), No. n 19473 Oct. 10, 2020 (Oct. 10, 2020), XP030292239.

(Continued)

*Primary Examiner* — Dave Czekaj
*Assistant Examiner* — Shanika M Brumfield
(74) *Attorney, Agent, or Firm* — McAndrews, Held & Malloy, Ltd.

(57) ABSTRACT

A method for determining a sample adaptive offset mode includes: obtaining a motion vector included in a first coding tree block, and obtaining a reference frame of a video frame of the first coding tree block; obtaining a video resolution and a frame rate, calculating a threshold based on the video resolution and the frame rate; if it is determined that the motion vector is not greater than the threshold, determining a second coding tree block based on the motion vector; determining whether an offset mode is trusted; and if the offset mode is trusted, obtaining offset modes of all second coding blocks, and using obtained all types of offset modes as offset modes of the first coding tree block.

19 Claims, 6 Drawing Sheets

(51) Int. Cl.
*H04N 19/169* (2014.01)
*H04N 19/176* (2014.01)

(56) References Cited

U.S. PATENT DOCUMENTS

| | | |
|---|---|---|
| 2014/0185665 A1 | 7/2014 | Pu et al. |
| 2017/0230656 A1* | 8/2017 | Leontaris ............. H04N 19/117 |
| 2019/0089954 A1 | 3/2019 | Miyoshi |
| 2021/0051320 A1* | 2/2021 | Tourapis ............. H04N 19/182 |

FOREIGN PATENT DOCUMENTS

| | | | | |
|---|---|---|---|---|
| CN | 107736026 A | * | 2/2018 | ........... H04N 19/114 |
| CN | 109756736 A | | 5/2019 | |
| CN | 113068050 A | | 7/2021 | |
| GB | 2531087 A | | 4/2016 | |
| WO | 2018092982 A2 | | 5/2018 | |
| WO | 2020257016 A1 | | 12/2020 | |
| WO | 2021025597 A1 | | 2/2021 | |

OTHER PUBLICATIONS

The extended European search report for Application No. 22770190. 1, dated Apr. 4, 2024, European Patent Office, Germany (12 pages).
International Search Report with a mailing date of Mar. 30, 2022, in International application No. PCT/CN2022/072844, filed on Jan. 20, 2022.

\* cited by examiner

Apparatus 70 for determining a sample adaptive offset mode of a coding tree block Obtaining means 71

Judgment means 72

First determination means 73

Calculation means 74

Second determination means 75

Usage means 76

DETERMINATION OF SAMPLE ADAPTIVE OFFSET MODE OF CODING TREE BLOCK

CROSS-REFERENCE TO RELATED APPLICATIONS

This application is a continuation under 35 U.S.C. 111(a) of PCT International Application No. PCT/CN2022/072844, filed on Jan. 20, 2022, which claims priority to Chinese Patent Application No. 202110283711.4, filed on Mar. 17, 2021, the entire contents of which are hereby incorporated by reference in their entirety for all purposes.

TECHNICAL FIELD

The present application relates to video image coding technologies, and in particular, to determining a sample adaptive offset mode of a coding tree block.

BACKGROUND

High Efficiency Video Coding (HEVC) is a video compression standard. After a video is compressed through HEVC, to reduce a distortion between a reconstructed image and an original image, pixel compensation is performed on the reconstructed image by using a sample adaptive offset (SAO) technology.

When pixel compensation is performed by using the SAO technology, pixel compensation may be implemented in an edge offset (EO) mode or a band offset (BO) mode. When pixel compensation is implemented in BO mode, it is necessary to calculate BO information of each coding tree block (CTB); when pixel compensation is implemented in EO mode, it is necessary to calculate horizontal direction (EO0) information, vertical direction (EO1) information, 135° direction (EO2) information, and 45° direction (E03) information of each CTB in EO mode.

SUMMARY

In view of this, a method and apparatus for determining a sample adaptive offset mode of a coding tree block, a computer device, and a computer-readable storage medium are now provided.

The present application provides a method for determining a sample adaptive offset mode of a coding tree block, including:

obtaining a motion vector of at least one prediction unit included in a first coding tree block currently to be processed, and obtaining a reference frame of a video frame corresponding to the first coding tree block;

obtaining a video resolution and a video frame rate of a video, calculating a threshold based on the video resolution and the video frame rate, and determining, according to a preset rule, whether the motion vector is greater than the threshold;

if it is determined that the motion vector is not greater than the threshold, determining, based on the motion vector, all second coding tree blocks to be referenced by the first coding tree block in the reference frame;

sequentially calculating a first probability that a sample adaptive offset mode is enabled for all coding tree blocks in a preset direction of each of the second coding tree blocks, and calculating a second probability that the sample adaptive offset mode is enabled for all coding tree blocks in the preset direction of the first coding tree block; and determining, based on each first probability and the second probability, whether sample adaptive offset modes of all the second coding tree blocks are trusted;

and if the sample adaptive offset modes of all the second coding tree blocks are trusted, obtaining the sample adaptive offset modes of all the second coding tree blocks, and using obtained all types of sample adaptive offset modes as sample adaptive offset modes of the first coding tree block.

Optionally, the method further includes: obtaining attribute information of the first coding tree block, the attribute information including at least one of: an abscissa and an ordinate of the first coding tree block, and information about a layer in which the video frame corresponding to the first coding tree block is located;

determining whether the attribute information meets a preset condition; and if the attribute information does not meet the preset condition, performing the step of obtaining a motion vector of at least one prediction unit included in a first coding tree block currently to be processed, and obtaining a reference frame of a video frame corresponding to the first coding tree block.

Optionally, the determining whether the attribute information meets a preset condition includes:

determining whether the abscissa is less than a first preset value; or determining whether the abscissa is less than a second preset value; or determining whether the information about the layer indicates a preset layer.

Optionally, the method further includes:

if the attribute information meets the preset condition, using all the sample adaptive offset modes as the sample adaptive offset modes of the first coding tree block; or if it is determined that the motion vector is greater than the threshold, using all the sample adaptive offset modes as the sample adaptive offset modes of the first coding tree block; or if it is determined, based on each first probability and the second probability, that the sample adaptive offset modes of all the second coding tree blocks are not trusted, using all the sample adaptive offset modes as the sample adaptive offset modes of the first coding tree block.

Optionally, the using the obtained all types of sample adaptive offset modes as sample adaptive offset modes of the first coding tree block includes:

adding the obtained sample adaptive offset modes of all the second coding tree blocks to a sample adaptive offset mode list; and deleting a repeated sample adaptive offset mode included in the sample adaptive offset mode list from the sample adaptive offset mode list, and using a remaining sample adaptive offset mode obtained after the deletion as a sample adaptive offset mode of the first coding tree block.

Optionally, the method further includes:

obtaining a sample adaptive offset mode of a third coding tree block at a preset position relative to the first coding tree block, where the preset position includes at least one of: a left position, an upper position, an upper-left corner position, and an upper-right corner position; and adding the sample adaptive offset mode of the third coding tree block to the sample adaptive offset mode list.

Optionally, the motion vector includes a value of an abscissa x and a value of an ordinate y, and the determining, according to a preset rule, whether the motion vector is greater than the threshold includes:

determining whether $a*|x|$ is greater than the threshold; or determining whether $a*|y|$ is greater than the threshold; or determining whether $a*\sqrt{x^2-y^2}$ is greater than the threshold, where a is a preset constant.

Optionally, the determining, based on the motion vector, all second coding tree blocks to be referenced by the first coding tree block in the reference frame includes:

determining a reference region of the first coding tree block in the reference frame based on the motion vector and a size of the first coding tree block; and using a coding tree block overlapping the reference region in coding tree blocks of the reference frame as the second coding tree block.

The present application further provides an apparatus for determining a sample adaptive offset mode of a coding tree block, including:

an obtaining means configured to obtain a motion vector of at least one prediction unit included in a first coding tree block currently to be processed, and obtain a reference frame of a video frame corresponding to the first coding tree block;

a judgment means configured to obtain a video resolution and a video frame rate of a video, calculate a threshold based on the video resolution and the video frame rate, and determine, according to a preset rule, whether the motion vector is greater than the threshold;

a first determination means configured to: if it is determined that the motion vector is not greater than the threshold, determine, based on the motion vector, all second coding tree blocks to be referenced by the first coding tree block in the reference frame;

a calculation means configured to sequentially calculate a first probability that a sample adaptive offset mode is enabled for all coding tree blocks in a preset direction of each of the second coding tree blocks, and calculate a second probability that the sample adaptive offset mode is enabled for all coding tree blocks in the preset direction of the first coding tree block;

a second determination means configured to determine, based on each first probability and the second probability, whether sample adaptive offset modes of all the second coding tree blocks are trusted;

an adding means configured to: if the sample adaptive offset modes of all the second coding tree blocks are trusted, obtain the sample adaptive offset modes of all the second coding tree blocks, and use obtained all types of sample adaptive offset modes as sample adaptive offset modes of the first coding tree block; and a usage means configured to use all sample adaptive offset modes included in the sample adaptive offset mode list as the sample adaptive offset modes of the first coding tree block.

The present application further provides a computer device including a memory, a processor, and computer-readable instructions stored on the memory and capable of running on the processor, where when the processor executes the computer-readable instructions, the steps of the method as described above are implemented.

The present application further provides a computer-readable storage medium having computer-readable instructions stored thereon, where when the computer-readable instructions are executed by a processor, the steps of the method as described above are implemented.

DETAILED DESCRIPTION OF EMBODIMENTS

The advantages of the present application are further described below with reference to accompanying drawings and specific embodiments.

Exemplary embodiments are illustrated in detail here, and examples thereof are shown in the accompanying drawings. When the following description refers to the figures, the same numerals in different figures represent the same or similar elements unless otherwise indicated. The implementations described in the following exemplary embodiments do not represent all implementations consistent with the present disclosure. Instead, they are merely examples of apparatuses and methods consistent with some aspects of the present disclosure as detailed in the appended claims.

The terms used in the present disclosure are merely for the purpose of describing specific embodiments, and are not intended to limit the present disclosure. The terms "a/an", "said", and "the" in the singular form used in the present disclosure and the appended claims are also intended to include the plural form unless otherwise clearly indicated in the context. It should also be understood that the term "and/or" used herein refers to and includes any or all possible combinations of one or more of the associated listed items.

It should be understood that although the terms, such as first, second, and third, may be used in the present disclosure to describe various types of information, such information should not be limited to these terms. These terms are merely used to distinguish the same type of information from one another. For example, without departing from the scope of the present disclosure, first information may alternatively be referred to as second information, and similarly, second information may alternatively be referred to as first information. Depending on the context, the word "if" as used herein may be interpreted as "when" or "upon" or "in response to determining".

In the description of the present application, it should be understood that, the reference numerals of steps do not indicate the order of execution of the steps, but are merely to facilitate the description of the present application and differentiation between the steps, and thus will not be interpreted as limiting the present application.

The inventors found that in the existing standard implementation of the calculation methods used in the process of pixel compensation, processing using both BO and EO algorithms is at the pixel level. Each EO algorithm (EO0, EO1, EO2, and EO3) has 4 types to be processed, so that the EO algorithm has a total of 16 times of pixel-level processing. The BO algorithm and the EO algorithm have a total of 17 times of pixel-level processing, which takes a lot of time in an encoder.

To solve the above problem that the existing SAO technology needs to perform 17 times of pixel-level processing when compensating pixels, resulting in a problem that it takes a lot of time in an encoder, the embodiments herein provide a method and an apparatus for determining a sample adaptive offset mode as follows.

Figure 1:
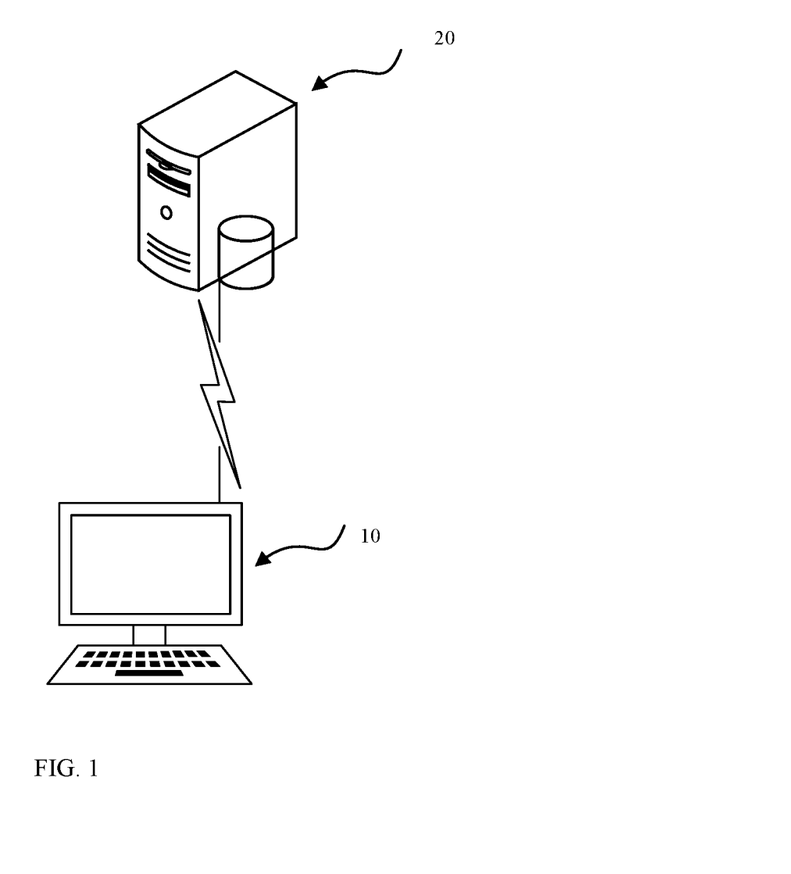
FIG. 1 is a schematic diagram of an environment of a method for determining a sample adaptive offset mode of a coding tree block according to an embodiment of the present application.

FIG. 1 is a schematic architectural diagram of a method for determining a sample adaptive offset mode of a coding tree block according to an embodiment of the present application. In an exemplary embodiment, a system of the application environment may include a computer device 10 and a server 20. A wireless or wired connection is formed between the computer device 10 and the server 20. The computer device 10 may be a mobile phone, an iPad, a tablet computer, a server, or the like. The sever 20 may be a rack server, a blade server, a tower server, or a cabinet server (including an independent server or a server cluster that includes a plurality of servers).

Figure 2:
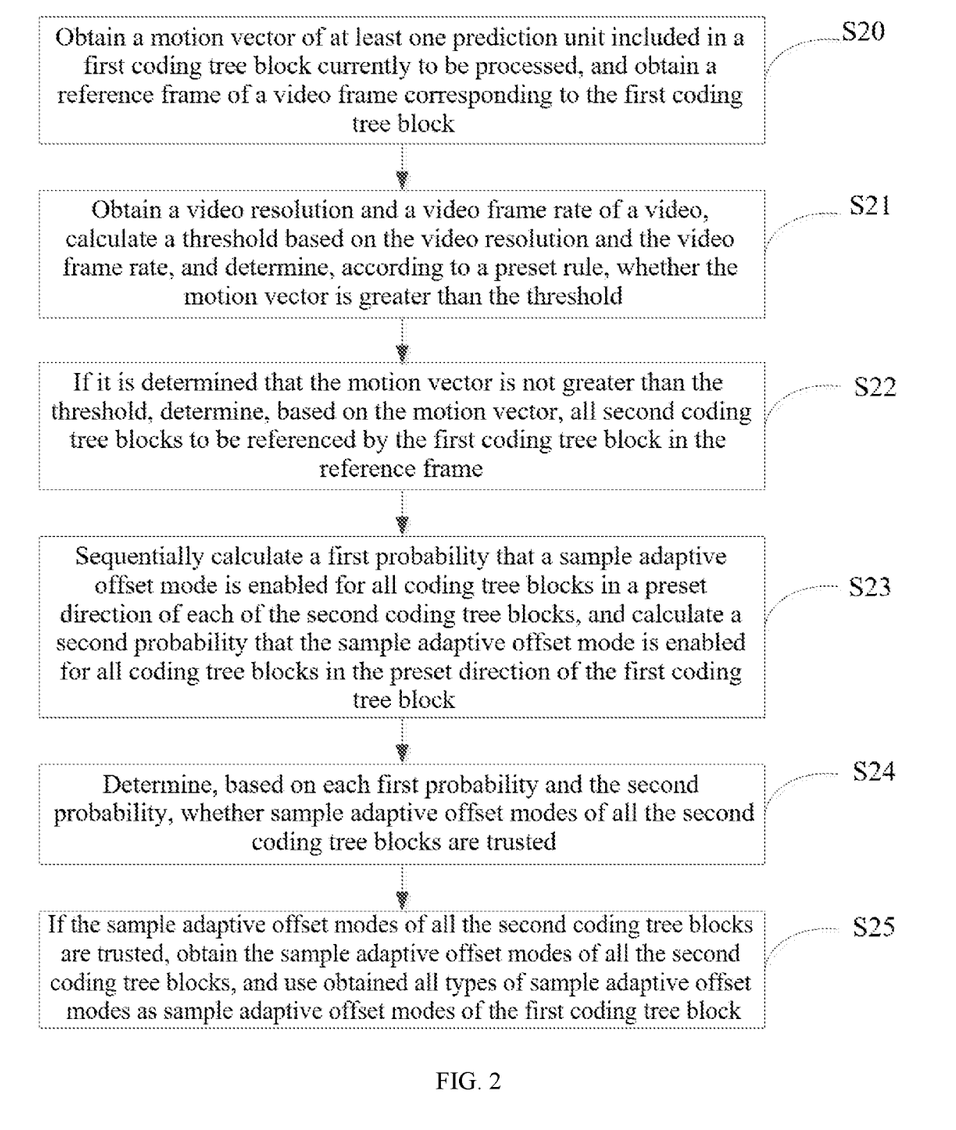
FIG. 2 is a flowchart of an embodiment of a method for determining a sample adaptive offset mode of a coding tree block according to the present application.

FIG. 2 is a schematic flowchart of a method for determining a sample adaptive offset mode of a coding tree block according to an embodiment of the present application. It may be understood that the flowchart in this method embodiment is not intended to limit an execution sequence of the steps. The following gives exemplary description by using a computer device as an execution body. It can be learned from the figure that the method for determining a sample adaptive offset mode of a coding tree block in this embodiment includes the following steps.

In step S20, a motion vector of at least one prediction unit included in a first coding tree block currently to be processed is obtained, and a reference frame of a video frame corresponding to the first coding tree block is obtained.

According to some embodiments, a coding tree block (CTB) may be a luma CTB or a chroma CTB included in a coding tree unit (CTU) in a sample adaptive offset (SAO) technology in HEVC. A coding tree block includes a plurality of reconstructed pixels, for example, includes 16*16, 32*32, or 64*64 pixels. It should be noted that a reconstructed pixel is a pixel obtained after each pixel in an original image is restored.

A coding tree block may be adaptively divided into a plurality of coding blocks (CB) based on image content in the coding tree block, where rules for CB division are: a relatively flat region may be divided into large CBs, while a region with more details may be divided into smaller CBs. Generally, a CB is in a square shape. A size of a luma component CB may range from 8×8 to a size of a luma CTB, and a size of a chroma CB may range from 4×4 to a size of a chroma CTB (that is, a size of a luma CTB is a maximally supported size of a luma CB, and a size of a chroma CTB is a maximally supported size of a chroma CB).

A CB can be further divided into a prediction unit (PU) and a transform unit (TU), where each PU has a set of motion parameters, including motion vector MV, reference frame index, and reference table flag.

In this embodiment, since the original image has been reconstructed and the reconstructed image is generated when performing sample adaptive offset (SAO) on the image, and in the process of generating the reconstructed image, various parameters used for generating the reconstructed image are saved. Therefore, in this embodiment, during obtaining of a motion vector, the saved various parameters may be directly searched to obtain a motion vector of at least one prediction unit included in the first coding tree block, so as to obtain the motion vector.

In an implementation, during obtaining of a motion vector, only a motion vector of one prediction unit included in the first coding tree block, or motion vectors of all prediction units included in the first coding tree block may be obtained, or operation vectors of some prediction units included in the first coding tree block may be obtained.

As an example, it is assumed that the first coding tree block includes eight prediction units: PU1, PU2, PU3, PU4, PU5, PU6, PU7, and PU8. During obtaining of a motion vector, only a motion vector of PU1, or motion vectors of PU1, PU2, and PU3, or motion vectors of PU1, PU2, PU3, PU4, PU5, PU6, PU7, and PU8 may be obtained, and so on.

In HEVC, a video frame is divided into several non-overlapping CTBs for representing independent regions in the video frame. A size of a luma CTB may be 16*16/32*32/64*64, a size of a chroma CTB may be 8*8/16*16/32*32, and the larger the size, the better the compression effect.

In addition, in HEVC, when a video is processed, all video frames included in the video may be divided into several small groups of pictures (GOP), and each group of pictures includes several video frames arranged in chronological order. In video coding of HEVC, there are two GOP types: closed GOP and open GOP. Each GOP includes the following configuration parameters:

Type: a slice type, can be one of I, B, and P;
POC: display order of images in a GOP, with a value ranging from 1 to GOPSize;
QPOffset: a quantization parameter offset used to calculate an actual quantization parameter of this frame;
QPFactor: a weight used during rate-distortion optimization.
tcOffsetDiv2: an offset of a loop filter parameter;
betaOffsetDiv2: an offset of a loop filter parameter;
temporal_id: a serial number of a time-domain sublayer where a current frame is located;
num_ref_pics_active: a size of a reference picture list L0 or Li; indicates how many reference frames are used in the encoding process;
num_ref_pics: the number of reference frames kept for a current frame, including reference frames used for the current frame and a future frame;
reference pictures: saves the POC of a reference frame relative to the POC of the current frame, the number of which being specified by num_ref_pics;
predict: defines a value of inter ref_pic_set_prediction_flag, a value of 0 indicating that the RPS is encoded without RPS prediction, and the subsequent parameters deltaRIdx-1, deltaRPS, and the like are ignored; a value of 1 indicating that the RPS is encoded with RPS prediction using deltaRIdx−1, deltaRPS, num ref idcs, and Reference idcs; a value of 2 indicating that the RPS is encoded with RPS prediction using only deltaRIdx−1;

deltaRIdx−1: a difference between an index of a current RPS and an index of a predicted RPS minus 1;

deltaRPS: a difference between the POC of a predicted RPS and the POC of a current RPS;

num_ref_idcs: the number of ref_idcs used for encoding a current RPS;

reference_idcs: specifies ref_idcs for inter-RPS prediction.

In this embodiment, during obtaining of a reference frame of the first coding tree block, a video frame to which the first coding tree block belongs is find first, for example, it belongs to a video frame A. After it is determined that the current first coding tree block belongs to the video frame A, a reference frame of the video frame A may be find from the parameter reference pictures in the GOP configuration parameters, for example, the reference frames are a video frame B and a video frame C.

In step S21, a video resolution and a video frame rate of a video are obtained, a threshold is calculated based on the video resolution and the video frame rate, and whether the motion vector is greater than the threshold is determined according to a preset rule.

According to some embodiments, Threshold Th=Video resolution Re/Video frame rate Fr.

As an example, assuming that the video resolution is 720P and the video frame rate is 60 frames per second (FPS, the number of frames displayed per second), Th=720/60=12.

The motion vector MV includes a value of an abscissa x and a value of an ordinate y, for example, a motion vector (x, y) is (32, 32).

The preset rule is a rule preset for determining whether the motion vector MV is greater than the threshold Th.

In an exemplary implementation, the determining, according to a preset rule, whether the motion vector is greater than the threshold may include:
determining whether $a*|x|$ is greater than the threshold; or
determining whether $a*|y|$ is greater than the threshold; or
determining whether $a*\sqrt{x^2-y^2}$ is greater than the threshold,
where a is a preset constant.

According to some embodiments, when $a*|x|>Th$, or $a*|y|>Th$, or $a*\sqrt{x^2-y^2}>Th$, it can be determined that the motion vector is greater than the threshold, where a is a preset constant, and a specific value thereof may be set and adjusted according to actual conditions. For example, a=1, a=0.8, and so on. In this embodiment, the specific value of a is preferably 1.

It should be noted that the symbol "||" is a symbol for calculating an absolute value. When a plurality of motion vectors are obtained, as long as there is one motion vector that satisfies $a*|x|>Th$, or $a*|y|>Th$, or $a*\sqrt{x^2-y^2}>Th$, it can be determined that the motion vector is greater than the threshold. Certainly, alternatively, as long as all motion vectors satisfy $a*|x|>Th$, or $a*|y|>Th$, or $a*\sqrt{x^2-y^2}>Th$, it can be determined that the motion vector is greater than the threshold.

It can be understood that, in other implementations, whether the motion vector is greater than the threshold may alternatively be determined by determining whether $a*|x+y|$ is greater than the threshold, which is not limited in this embodiment.

In step S22, if it is determined that the motion vector is not greater than the threshold, all second coding tree blocks to be referenced by the first coding tree block in the reference frame are determined based on the motion vector.

According to some embodiments, if it is determined that the motion vector is less than or equal to the threshold, all the second coding tree blocks that are to be referenced by the first coding tree block in the reference frame are determined based on the motion vector.

In this embodiment, when there are a plurality of motion vectors, all second coding tree blocks CTB2 to be referenced by the first coding tree block CTB1 in the reference frame need to be determined based on each motion vector. Similarly, when there are a plurality of reference frames, all CTB2 to be referenced by CTB1 in the different reference frames need to be determined in sequence based on each motion vector.

As an example, assuming that the motion vector MV includes MV1 and MV2, and the reference frame includes a reference frame 1 and a reference frame 2, to determine CTB2, it is necessary to: determine, based on MV1, all CTB2 to be referenced by CTB1 in the reference frame 1 and all CTB2 to be referenced by CTB1 in the reference frame 2; and determine, based on MV2, all CTB2 to be referenced by CTB1 in the reference frame 1 and all CTB2 to be referenced by CTB1 in the reference frame 2.

Figure 3:
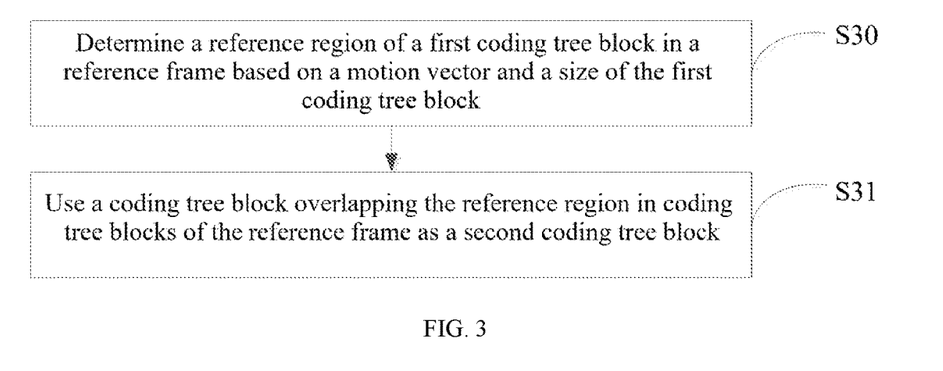
FIG. 3 is a detailed schematic flowchart of a step of determining, based on a motion vector, all second coding tree blocks to be referenced by a first coding tree block in a reference frame according to an implementation of the present application.

In an exemplary implementation, referring to FIG. 3, the determining, based on the motion vector, all second coding tree blocks to be referenced by the first coding tree block in the reference frame may include steps S30 to S31.

In step S30, a reference region of the first coding tree block in the reference frame is determined based on the motion vector and a size of the first coding tree block.

According to some embodiments, if there are a plurality of motion vectors, during determining of the reference region, it is necessary to determine a reference region based on each motion vector and the size of the first coding tree block, that is, the number of times of determining reference regions is the number of motion vectors.

In this embodiment, during determining of the reference region, a reference region in a square shape is obtained, with coordinates of the motion vector as the center and the size as a side length of the square shape.

As an example, assuming that there are a plurality of motion vectors MV: MV1=(32, 32), MV2=(128, 128), and a size of the first coding tree block is 64*64, the reference regions are the shadow regions A and B in FIG. 4.

In step S31, a coding tree block overlapping the reference region in coding tree blocks of the reference frame is used as the second coding tree block.

Figure 4:
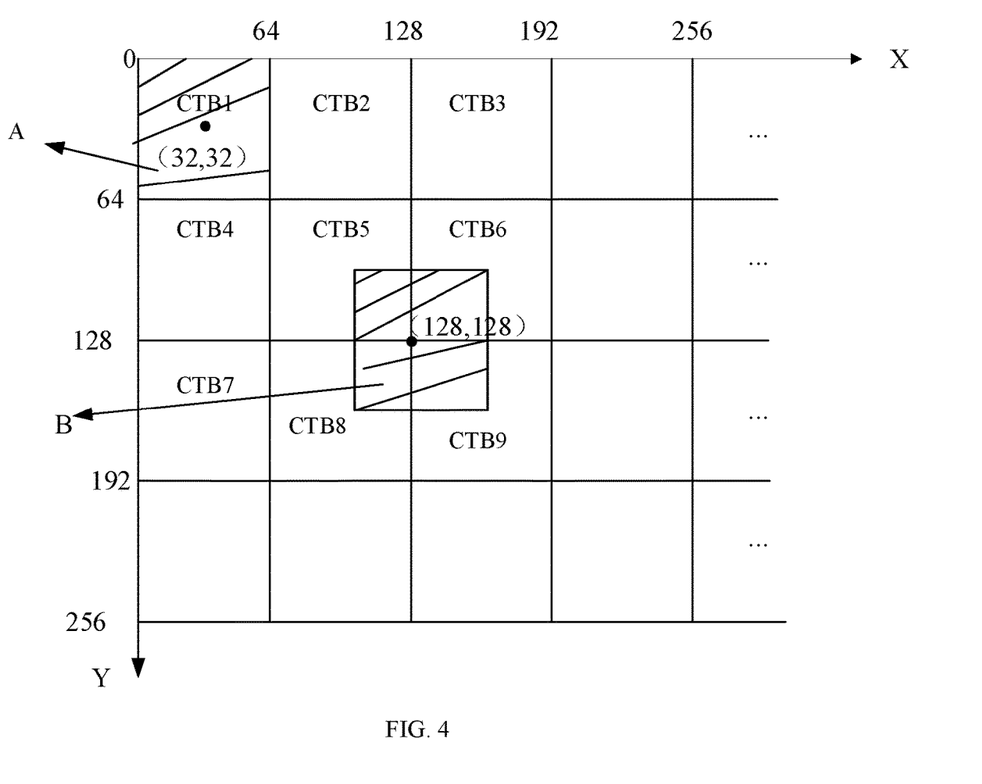
FIG. 4 is a schematic diagram of a plurality of coding tree blocks obtained through division of a video frame.

As an example, if the reference regions are those shown in FIG. 4, the coding tree blocks CTB1, CTB5, CTB6, CTB8, and CTB9 in FIG. 4 may be used as the second coding tree blocks.

In an exemplary implementation, if it is determined that the motion vector is greater than the threshold, all sample adaptive offset modes may be used as sample adaptive offset modes of the first coding tree block.

According to some embodiments, all the sample adaptive offset modes are a BO mode and an EO mode in the SAO, where the EO mode includes an EO0 mode, an EO1 mode, an EO2 mode, and an EO3 mode. In other words, all the sample adaptive offset modes include the BO mode, the EO0 mode, the EO1 mode, the EO2 mode, and the EO3 mode.

In step S23, a first probability that a sample adaptive offset mode is enabled for all coding tree blocks in a preset direction of each of the second coding tree blocks is sequentially calculated, and a second probability that the sample adaptive offset mode is enabled for all coding tree blocks in the preset direction of the first coding tree block is calculated.

According to some embodiments, the preset direction is a direction set in advance, and the direction may be set and adjusted according to actual conditions. The preset direction is preferably an upper and left direction, where all coding tree blocks in the upper and left direction are coding tree blocks to the left and above the second coding tree blocks.

As an example, coding tree blocks in the upper and left direction of the second coding tree block CTB5 include CTB1, CTB2, CTB3, CTB4, etc.; coding tree blocks in the upper and left direction of the second coding tree block CTB6 include CTB1, CTB2, CTB3, CTB4, CTB5, etc.; coding tree blocks in the upper and left direction of the second coding tree block CTB8 include CTB1, CTB2, CTB3, CTB4, CTB5, CTB6, CTB7, etc.; and coding tree blocks in the upper and left direction of the second coding tree block CTB9 include CTB1, CTB2, CTB3, CTB4, CTB5, CTB6, CTB7, CTB8, etc.

Enabling the sample adaptive offset mode for a coding tree block means that any one of the BO mode, the EO0 mode, the EO1 mode, the EO2 mode, and the EO3 mode is selected for the coding tree block for pixel compensation; disabling the sample adaptive offset mode for a coding tree block means that no one of the BO mode, the EO0 mode, the EO1 mode, the EO2 mode, and the EO3 mode is selected for the coding tree block for pixel compensation.

As an example, referring to FIG. 4, assuming that there are a total of 10 CTBs in the preset direction of the second coding tree block CTB5, of which 6 are enabled with the sample adaptive offset mode, the first probability pref1=6/10; assuming that there are a total of 11 CTBs in the preset direction of the second coding tree block CTB6, of which 6 are enabled with the sample adaptive offset mode, the first probability pref2=6/11; assuming that there are a total of 20 CTBs in the preset direction of the second coding tree block CTB8, of which 13 are enabled with the sample adaptive offset mode, the first probability pref3=13/20; and assuming that there are a total of 21 CTBs in the preset direction of the second coding tree block CTB9, of which 14 are enabled with the sample adaptive offset mode, the first probability pref4=14/21.

Similarly, assuming that there are a total of 10 CTBs in the preset direction of the first coding tree block, of which 5 are enabled with the sample adaptive offset mode, the second probability pcurr=5/10.

In step S24, whether sample adaptive offset modes of all the second coding tree blocks are trusted is determined based on each first probability and the second probability.

In an implementation, when all the first probabilities pref are greater than the second probability pcurr, that is, when all pref>pcurr, it can be determined that the sample adaptive offset modes of all the second coding tree blocks are trusted.

In another implementation, when one of all the first probabilities pref is greater than the second probability pcurr, that is, when one pref>pcurr, it can be determined that the sample adaptive offset modes of all the second coding tree blocks are trusted.

In an exemplary implementation, if it is determined, based on each first probability and the second probability, that the sample adaptive offset modes of all the second coding tree blocks are not trusted, using all the sample adaptive offset modes as the sample adaptive offset modes of the first coding tree block.

According to some embodiments, all the sample adaptive offset modes are a BO mode and an EO mode in the SAO, where the EO mode includes an EO0 mode, an EO1 mode, an EO2 mode, and an EO3 mode. In other words, all the sample adaptive offset modes include the BO mode, the EO0 mode, the EO1 mode, the EO2 mode, and the EO3 mode.

In step S25, if the sample adaptive offset modes of all the second coding tree blocks are trusted, the sample adaptive offset modes of all the second coding tree blocks are obtained, and obtained all types of sample adaptive offset modes are used as sample adaptive offset modes of the first coding tree block.

According to some embodiments, the all types of sample adaptive offset modes are different types of sample adaptive offset modes. Being trusted or not means whether the sample adaptive offset modes of all the second coding tree blocks may be used as the sample adaptive offset modes of the first coding tree block.

In this embodiment, if it is determined that the sample adaptive offset modes of all the second coding tree blocks are trusted, the sample adaptive offset modes of all the second coding tree blocks may be find from prestored various parameters, and the obtained all types of sample adaptive offset modes are used as the sample adaptive offset modes of the first coding tree block.

As an example, assuming that there are four second coding tree blocks, namely, CTB a, CTB b, CTB c, and CTB d, and obtained sample adaptive offset modes are respectively the BO mode, the EO0 mode, the EO0 mode, and the EO3 mode, the BO mode, the EO0 mode, and the EO3 mode may be used as the sample adaptive offset modes of the first coding tree block.

The above technical solutions have the beneficial effects as follows. In the embodiments of the present application, a motion vector of at least one prediction unit included in a first coding tree block currently to be processed is obtained, and a reference frame of a video frame corresponding to the first coding tree block is obtained; a video resolution and a video frame rate of a video are obtained, a threshold is calculated based on the video resolution and the video frame rate, and whether the motion vector is greater than the threshold is determined according to a preset rule; if it is determined that the motion vector is not greater than the threshold, all second coding tree blocks to be referenced by the first coding tree block in the reference frame are determined based on the motion vector; a first probability that a sample adaptive offset mode is enabled for all coding tree blocks in a preset direction of each of the second coding tree blocks is sequentially calculated, and a second probability that the sample adaptive offset mode is enabled for all coding tree blocks in the preset direction of the first coding tree block is calculated; whether sample adaptive offset modes of all the second coding tree blocks are trusted is determined based on each first probability and the second probability; and if the sample adaptive offset modes of all the second coding tree blocks are trusted, the sample adaptive offset modes of all the second coding tree blocks are obtained, and obtained all types of sample adaptive offset modes are used as sample adaptive offset modes of the first coding tree block. In the embodiments of the present application, time-domain correlation is used to use the sample adaptive offset modes, of all the second coding tree blocks that are to be referenced by the first coding tree block in the reference frame and determined based on the motion vector, as the sample adaptive offset modes of the first coding tree block, so that a BO mode or some EO modes may be extracted or removed, thereby reducing the number of times of pixel-level processing, and further reducing time consumption of an encoding process.

Figure 5:
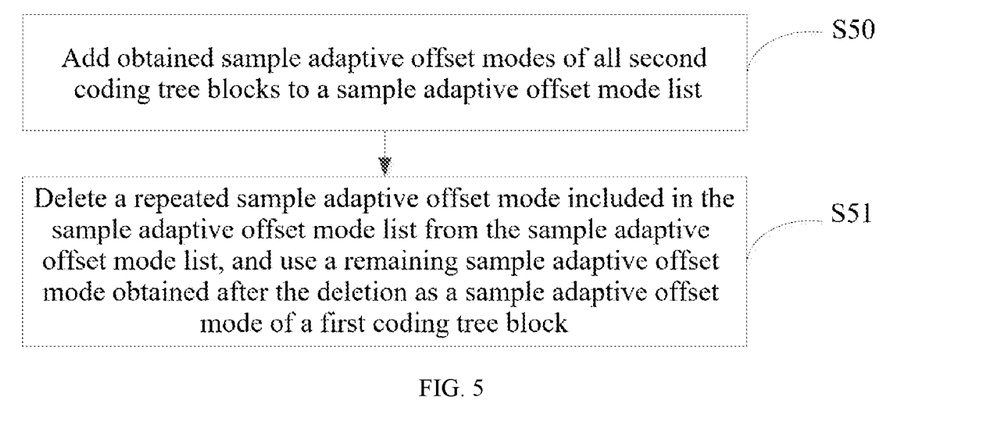
FIG. 5 is a detailed schematic flowchart of a step of using obtained all types of sample adaptive offset modes as sample adaptive offset modes of a first coding tree block according to an implementation of the present application.

In an exemplary implementation, referring to FIG. 5, the using the obtained all types of sample adaptive offset modes as sample adaptive offset modes of the first coding tree block may include steps S50 to S51.

In step S50, the obtained sample adaptive offset modes of all the second coding tree blocks are added to a sample adaptive offset mode list.

According to some embodiments, a sample adaptive offset mode list SAO_LIST may be pre-declared for storing sample adaptive offset modes. In this embodiment, an initial value of SAO_LIST is empty. After all the sample adaptive offset modes of the second coding tree blocks are obtained, these sample adaptive offset modes may be added to SAO_LIST.

In step S51, a repeated sample adaptive offset mode included in the sample adaptive offset mode list is deleted from the sample adaptive offset mode list, and a remaining sample adaptive offset mode obtained after the deletion is used as a sample adaptive offset mode of the first coding tree block.

As an example, assuming that the obtained sample adaptive offset modes of all the second coding tree blocks are the BO mode, the EO0 mode, the EO0 mode, and the EO3 mode in sequence, since there are two EO0 modes in SAO_LIST, one EO0 mode may be deleted from SAO_LIST, and a remaining sample adaptive offset mode in SAO_LIST is used as the sample adaptive offset mode of the first coding tree block, that is, the BO mode, the EO0 mode, and the EO3 mode are used as the sample adaptive offset modes of the first coding tree block.

In this embodiment, the sample adaptive offset modes of all the second coding tree blocks are stored in the list after being obtained, so that a repeated sample adaptive offset mode may be conveniently deleted subsequently.

In this embodiment of the present application, a motion vector of at least one prediction unit included in a first coding tree block currently to be processed is obtained, and a reference frame of a video frame corresponding to the first coding tree block is obtained; obtaining a video resolution and a video frame rate of a video, calculating a threshold based on the video resolution and the video frame rate, and determining, according to a preset rule, whether the motion vector is greater than the threshold; if it is determined that the motion vector is not greater than the threshold, all second coding tree blocks to be referenced by the first coding tree block in the reference frame are determined based on the motion vector; a first probability that a sample adaptive offset mode is enabled for all coding tree blocks in a preset direction of each of the second coding tree blocks is sequentially calculated, and a second probability that the sample adaptive offset mode is enabled for all coding tree blocks in the preset direction of the first coding tree block is calculated; whether sample adaptive offset modes of all the second coding tree blocks are trusted is determined based on each first probability and the second probability; and if the sample adaptive offset modes of all the second coding tree blocks are trusted, the sample adaptive offset modes of all the second coding tree blocks are obtained, and obtained all types of sample adaptive offset modes are used as sample adaptive offset modes of the first coding tree block. In this embodiment of the present application, time-domain correlation is used to use the sample adaptive offset modes, of all the second coding tree blocks that are to be referenced by the first coding tree block in the reference frame and determined based on the motion vector, as the sample adaptive offset modes of the first coding tree block, so that a BO mode or some EO modes may be extracted or removed, thereby reducing the number of times of pixel-level processing, and further reducing time consumption of an encoding process.

Figure 6:
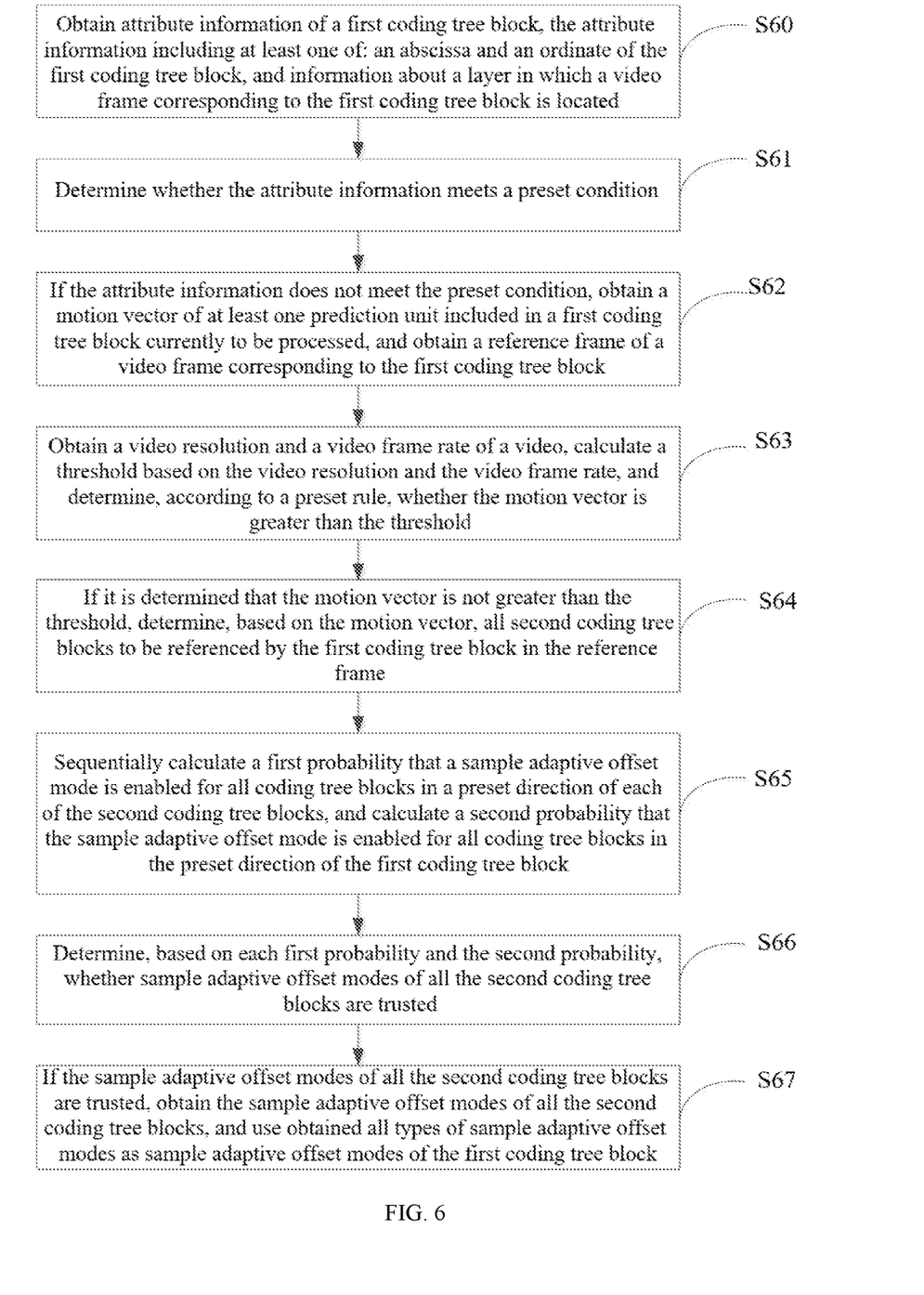
FIG. 6 is a flowchart of another embodiment of a method for determining a sample adaptive offset mode of a coding tree block according to the present application.

In another exemplary implementation, referring to FIG. 6, the method for determining a sample adaptive offset mode of a coding tree block includes the following steps.

In step S60, attribute information of the first coding tree block is obtained, the attribute information including at least one of: an abscissa and an ordinate of the first coding tree block, and information about a layer in which the video frame corresponding to the first coding tree block is located.

Figure 7:
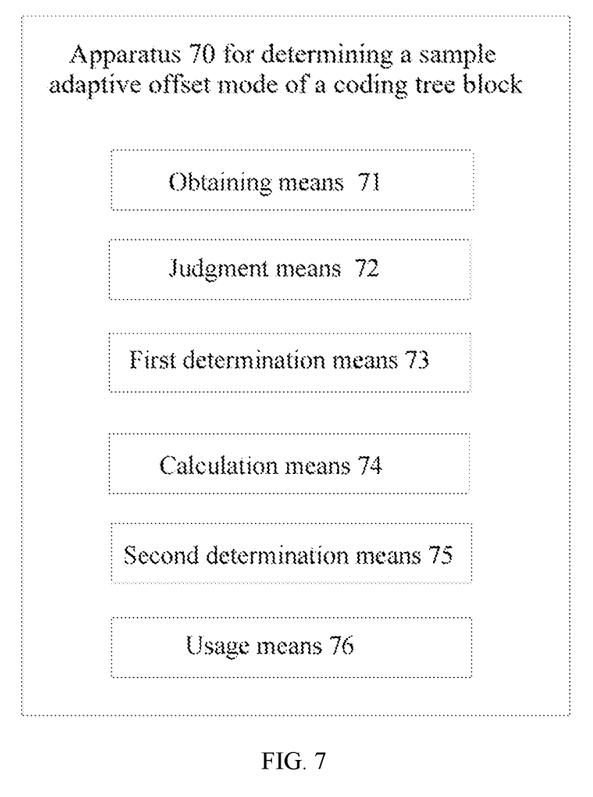
FIG. 7 is a diagram of program means of an embodiment of an apparatus for determining a sample adaptive offset mode of a coding tree block according to the present application.

According to some embodiments, in HEVC, a video frame is divided into several non-overlapping CTBs, and a coordinate system is established for conveniently determining a position of each CTB in a video frame. In one scenario, a coordinate system as shown in FIG. 7 may be established. When the abscissa or ordinate of the first coding tree block needs to be obtained, it can be determined according to the coordinate system.

It should be noted that, in this embodiment, the abscissa and ordinate of the first coding tree block are respectively the abscissa and ordinate of the upper-left vertex of the first coding tree block. Referring to FIG. 4, the abscissa of the first coding tree block CTB1 is 0, and the ordinate is also 0.

In this embodiment, information about the layer in which the video frame corresponding to the first coding tree block is located is a sequence number of a time-domain sublayer where the video frame corresponding to the first coding tree block is located, which may be obtained from the temporal_id parameter of the GOP where the video frame is located, for example, temporal_id=0, which means that the information about the layer in which the video frame corresponding to the first coding tree block is located indicates layer 0.

In step S61, whether the attribute information meets a preset condition is determined.

According to some embodiments, the preset condition is a condition set in advance for determining whether there is a need to execute the step of obtaining a motion vector of at least one prediction unit included in a first coding tree block currently to be processed.

In an exemplary implementation, the determining whether the attribute information meets a preset condition includes:
  determining whether the abscissa is less than a first preset value; or
  determining whether the abscissa is less than a second preset value; or
  determining whether the information about the layer indicates a preset layer.

According to some embodiments, the first preset value and the second preset value may be set and adjusted according to actual conditions, and the first preset value may be the same as or different from the second preset value. The preset layer may also be set and adjusted according to actual conditions.

As an example, if the first preset value is 32, the second preset value is also 32, and the preset layer is layer 0 and layer 1, it can be determined, when the abscissa is less than 32, the ordinate is less than 32, or the information about the layer is layer 0 or layer 1, that the attribute information meets the preset condition.

It can be understood that, in other implementations, whether the attribute information meets the preset condition may be determined by determining whether the abscissa is less than the first preset value and whether the ordinate is less than the second preset value, which is not limited in this embodiment.

In an exemplary implementation, if the attribute information meets the preset condition, all the sample adaptive offset modes are used as the sample adaptive offset modes of the first coding tree block.

According to some embodiments, all the sample adaptive offset modes are a BO mode and an EO mode in the SAO, where the EO mode includes an EO0 mode, an EO1 mode, an EO2 mode, and an EO3 mode. In other words, all the sample adaptive offset modes include the BO mode, the EO0 mode, the EO1 mode, the EO2 mode, and the EO3 mode.

In step S62, if the attribute information does not meet the preset condition, a motion vector of at least one prediction unit included in a first coding tree block currently to be processed is obtained, and a reference frame of a video frame corresponding to the first coding tree block is obtained.

In step S63, a video resolution and a video frame rate of a video are obtained, a threshold is calculated based on the video resolution and the video frame rate, and whether the motion vector is greater than the threshold is determined according to a preset rule.

In step S64, if it is determined that the motion vector is not greater than the threshold, all second coding tree blocks to be referenced by the first coding tree block in the reference frame are determined based on the motion vector.

In step S65, a first probability that a sample adaptive offset mode is enabled for all coding tree blocks in a preset direction of each of the second coding tree blocks is sequentially calculated, and a second probability that the sample adaptive offset mode is enabled for all coding tree blocks in the preset direction of the first coding tree block is calculated.

In step S66, whether sample adaptive offset modes of all the second coding tree blocks are trusted is determined based on each first probability and the second probability.

In step S67, if the sample adaptive offset modes of all the second coding tree blocks are trusted, the sample adaptive offset modes of all the second coding tree blocks are obtained, and obtained all types of sample adaptive offset modes are used as sample adaptive offset modes of the first coding tree block.

According to some embodiments, steps S62 to S67 are the same as steps S20 to S25 in the above embodiment, and will not be described in detail again in this embodiment.

In this embodiment of the present application, time-domain correlation is used to use the sample adaptive offset modes, of all the second coding tree blocks that are to be referenced by the first coding tree block in the reference frame and determined based on the motion vector, as the sample adaptive offset modes of the first coding tree block, so that a BO mode or some EO modes may be removed in advance, thereby reducing the number of times of pixel-level processing, and further reducing time consumption of an encoding process.

In an exemplary implementation, the method for determining a sample adaptive offset mode of a coding tree block may further include:

obtaining a sample adaptive offset mode of a third coding tree block at a preset position relative to the first coding tree block, where the preset position includes at least one of: a left position, an upper position, an upper-left corner position, and an upper-right corner position; and adding the sample adaptive offset mode of the third coding tree block to the sample adaptive offset mode list.

According to some embodiments, during obtaining of the sample adaptive offset mode of the third coding tree block, only a sample adaptive offset mode of a third coding tree block at one of the left position, the upper position, the upper-left corner position, and the upper-right corner position of the first coding tree block may be obtained, only sample adaptive offset modes of third coding tree blocks at two of the left position, the upper position, the upper-left corner position, and the upper-right corner position of the first coding tree block may be obtained, only sample adaptive offset modes of third coding tree blocks at three of the left position, the upper position, the upper-left corner position, and the upper-right corner position of the first coding tree block may be obtained, or sample adaptive offset modes of third coding tree blocks at all of the left position, the upper position, the upper-left corner position, and the upper-right corner position of the first coding tree block may be obtained, which is not limited in this embodiment.

After the sample adaptive offset mode of the third coding tree block is obtained, it may be added to the sample adaptive offset mode list as a reference sample adaptive offset mode of the first coding tree block.

It should be noted that, in this embodiment, the left position, the upper position, the upper-left corner, and the upper-right corner only refer to the left position, the upper position, the upper-left corner, and the upper-right corner that are closest to the first coding tree block.

In this embodiment, time domain and space domain are combined to determine the sample adaptive offset modes as the sample adaptive offset modes of the first coding tree block, so that a BO mode or some EO modes may be removed in advance, thereby reducing the number of times of pixel-level processing, and further reducing time consumption of an encoding process.

FIG. 7 is a diagram of program means of an embodiment of an apparatus 70 for determining a sample adaptive offset mode of a coding tree block according to the present application.

In this embodiment, the apparatus 70 for determining a sample adaptive offset mode of a coding tree block includes a series of the computer-readable instructions stored in a memory, where when the computer-readable instructions are executed by a processor, the function of determining a sample adaptive offset mode of a coding tree block according to each embodiment of the present application can be implemented. In some embodiments, based on the operations implemented by various parts of the computer-readable instructions, the apparatus 70 for determining a sample adaptive offset mode of a coding tree block may be divided into one or more means, which are as follows:

an obtaining means 71 configured to obtain a motion vector of at least one prediction unit included in a first coding tree block currently to be processed, and obtain a reference frame of a video frame corresponding to the first coding tree block;

a judgment means 72 configured to: obtain a video resolution and a video frame rate of a video, calculate a threshold based on the video resolution and the video frame rate, and determine, according to a preset rule, whether the motion vector is greater than the threshold;

a first determination means 73 configured to: if it is determined that the motion vector is not greater than the threshold, determine, based on the motion vector, all second coding tree blocks to be referenced by the first coding tree block in the reference frame;

a calculation means 74 configured to sequentially calculate a first probability that a sample adaptive offset mode is enabled for all coding tree blocks in a preset direction of each of the second coding tree blocks, and calculate a second probability that the sample adaptive offset mode is enabled for all coding tree blocks in the preset direction of the first coding tree block;

a second determination means 75 configured to determine, based on each first probability and the second probability, whether sample adaptive offset modes of all the second coding tree blocks are trusted;

a usage means 76 configured to: if the sample adaptive offset modes of all the second coding tree blocks are trusted, obtain the sample adaptive offset modes of all the second coding tree blocks, and use obtained all types of sample adaptive offset modes as sample adaptive offset modes of the first coding tree block.

In an exemplary implementation, the apparatus 70 for determining a sample adaptive offset mode of a coding tree block further includes an attribute information obtaining means, a preset condition judgment means, and an execution means.

The attribute information obtaining means is configured to obtain attribute information of the first coding tree block, the attribute information including at least one of: an abscissa and an ordinate of the first coding tree block, and information about a layer in which the video frame corresponding to the first coding tree block is located; The preset condition judgment means is configured to determine whether the attribute information meets a preset condition.

The execution means is configured to: if the attribute information does not meet the preset condition, perform the step of obtaining a motion vector of at least one prediction unit included in a first coding tree block currently to be processed, and obtain a reference frame of a video frame corresponding to the first coding tree block.

In an exemplary implementation, the preset condition judgment means is further configured to: determine whether the abscissa is less than a first preset value; or determine whether the abscissa is less than a second preset value; or determine whether the information about the layer indicates a preset layer.

In an exemplary implementation, the usage means 76 is further configured to: if the attribute information meets the preset condition, use all the sample adaptive offset modes as the sample adaptive offset modes of the first coding tree block; or if it is determined that the motion vector is greater than the threshold, use all the sample adaptive offset modes as the sample adaptive offset modes of the first coding tree block; or if it is determined, based on each first probability and the second probability, that the sample adaptive offset modes of all the second coding tree blocks are not trusted, use all the sample adaptive offset modes as the sample adaptive offset modes of the first coding tree block.

In an exemplary implementation, the usage means 76 is further configured to: add the obtained sample adaptive offset modes of all the second coding tree blocks to a sample adaptive offset mode list; and delete a repeated sample adaptive offset mode included in the sample adaptive offset mode list from the sample adaptive offset mode list, and use a remaining sample adaptive offset mode obtained after the deletion as a sample adaptive offset mode of the first coding tree block.

In an exemplary implementation, the apparatus 70 for determining a sample adaptive offset mode of a coding tree block further includes an adding means.

The obtaining means 71 is further configured to obtain a sample adaptive offset mode of a third coding tree block at a preset position of the first coding tree block, where the preset position includes at least one of: a left position, an upper position, an upper-left corner position, and an upper-right corner position.

The adding means is configured to add the sample adaptive offset mode of the third coding tree block to the sample adaptive offset mode list.

In an exemplary implementation, the motion vector includes a value of an abscissa x and a value of an ordinate y, and the judgment means 72 is further configured to determine whether $a*|x|$ is greater than the threshold; or determine whether $a*|y|$ is greater than the threshold; or determine whether $a*\sqrt{x^2-y^2}$ is greater than the threshold, where a is a preset constant.

In an exemplary implementation, the first determination means 73 is further configured to determine a reference region of the first coding tree block in the reference frame based on the motion vector and a size of the first coding tree block; and use a coding tree block overlapping the reference region in coding tree blocks of the reference frame as the second coding tree block.

In this embodiment of the present application, a motion vector of at least one prediction unit included in a first coding tree block currently to be processed is obtained, and a reference frame of a video frame corresponding to the first coding tree block is obtained; a video resolution and a video frame rate of a video are obtained, a threshold is calculated based on the video resolution and the video frame rate, and whether the motion vector is greater than the threshold is determined according to a preset rule; if it is determined that the motion vector is not greater than the threshold, all second coding tree blocks to be referenced by the first coding tree block in the reference frame are determined based on the motion vector; a first probability that a sample adaptive offset mode is enabled for all coding tree blocks in a preset direction of each of the second coding tree blocks is sequentially calculated, and a second probability that the sample adaptive offset mode is enabled for all coding tree blocks in the preset direction of the first coding tree block is calculated; whether sample adaptive offset modes of all the second coding tree blocks are trusted is determined based on each first probability and the second probability; and if the sample adaptive offset modes of all the second coding tree blocks are trusted, the sample adaptive offset modes of all the second coding tree blocks are obtained, and obtained all types of sample adaptive offset modes are used as sample adaptive offset modes of the first coding tree block. In this embodiment of the present application, time-domain correlation is used to use the sample adaptive offset modes, of all the second coding tree blocks that are to be referenced by the first coding tree block in the reference frame and determined based on the motion vector, as the sample adaptive offset modes of the first coding tree block, so that a BO mode or some EO modes may be extracted or removed, thereby reducing the number of times of pixel-level processing, and further reducing time consumption of an encoding process.

Figure 8:
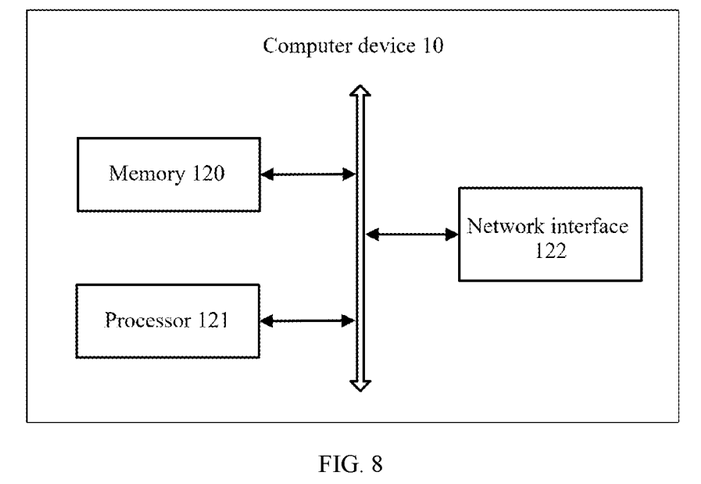
FIG. 8 is a schematic diagram of a hardware structure of a computer device that executes a method for determining a sample adaptive offset mode of a coding tree block according to an embodiment of the present application.

FIG. 8 is a schematic diagram of a hardware architecture of a computer device 10 applicable to implementation of a method for determining a sample adaptive offset mode of a coding tree block according to an embodiment of the present application. In this embodiment, the computer device 10 is a device that can automatically perform numerical calculation and/or information processing according to preset or prestored instructions. For example, the computer device may be a tablet computer, a notebook computer, a desktop computer, a rack server, a blade server, a tower server, a cabinet server (including an independent server, or a server cluster composed of a plurality of servers), etc. As shown in FIG. 8, the computer device 10 at least includes, but is not limited to: a memory 120, a processor 121, and a network interface 122, which may be communicatively linked to each other by using a system bus.

The memory 120 includes at least one type of computer-readable storage medium. The readable storage medium may be volatile or non-volatile. According to some embodiments, the readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 120 may be an internal storage means of the computer device 10, for example, a hard disk or memory of the computer device 10. In some other embodiments, the memory 120 may alternatively be an external storage device of the computer device 10, for example, a plug-in type hard disk equipped on the computer device 10, a smart media card (SMC for short), a secure digital (SD for short) card, or a flash card. Certainly, the memory 120 may alternatively include both the internal storage means of the computer device 10 and the external storage device of the computer device. In this embodiment, the memory 120 is generally configured to store an operating system and various application software installed in the computer device 10, such as program codes for a method for determining a sample adaptive offset mode of a coding tree block. In addition, the memory 120 may be further configured to temporarily store various types of data that have been output or are to be output.

The processor 121 may be, in some embodiments, a central processing unit (CPU for short), a controller, a microcontroller, a microprocessor, or other chips for determining a sample adaptive offset mode of a coding tree block. The processor 121 is generally configured to control overall operation of the computer device 10, for example, execute control, processing, and the like related to data interaction or communication with the computer device 10. In this embodiment, the processor 121 is configured to run program code stored in the memory 120 or to process data.

The network interface 122 may include a wireless network interface or a wired network interface. The network interface 122 is generally configured to establish a communication link between the computer device 10 and other computer devices. For example, the network interface 122 is configured to connect the computer device 10 to an external terminal by using a network, and establish a data transmission channel, a communication link, and the like between the computer device 10 and the external terminal. The network may be a wireless or wired network, such as Intranet, Internet, the Global System for Mobile Communications (GSM for short), wideband code division multiple access (WCDMA for short), a 4G network, a 5G network, Bluetooth, or Wi-Fi.

It should be noted that FIG. 8 shows only a computer device having components 120 to 122, but it should be understood that not all of the illustrated components are required to be implemented, and more or fewer components may be implemented instead.

In this embodiment, the method for determining a sample adaptive offset mode of a coding tree block stored in the memory 120 may alternatively be divided into one or more program means and executed by one or more processors (by the processor 121 in this embodiment) to implement the present application.

An embodiment of the present application provides a computer-readable storage medium having computer-readable instructions stored thereon, where when the computer-readable instructions are executed by a processor, the steps of the method for determining a sample adaptive offset mode of a coding tree block in the embodiments are implemented.

In this embodiment, the computer-readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the computer-readable storage medium may be an internal storage unit of the computer device, for example, a hard disk or memory of the computer device. In some other embodiments, the computer-readable storage medium may alternatively be an external storage device of the computer device, for example, a plug-in type hard disk equipped on the computer device, a smart media card (SMC for short), a secure digital (SD for short) card, or a flash card. Certainly, the computer-readable storage medium may alternatively include both the internal storage unit of the computer device and the external storage device of the computer device. In this embodiment, the computer-readable storage medium is generally used to store an operating system and various application software installed in the computer device, such as program codes for a method for determining a sample adaptive offset mode of a coding tree block in the embodiments. In addition, the computer-readable storage medium may be configured to temporarily store various types of data that have been output or are to be output.

The apparatus embodiments described above are merely exemplary, where units illustrated as separate components may be or may not be physically separated, and the components illustrated as units may be or may not be physical units. That is, the components may be positioned at one place or distributed on at least two network units. The object of the solutions in the embodiments of the present application can be achieved by selecting some or all of the means therein according to actual needs. Those of ordinary skill in the art can understand and implement the solutions without any creative effort.

Through the descriptions of the above implementations, those of ordinary skill in the art can clearly understand that the implementations can be implemented by software and general hardware platforms. Definitely, the implementations can also be implemented by hardware. Those of ordinary skill in the art can understand that all or some of the procedures in the methods of the foregoing embodiments can be implemented by computer-readable instructions to instruct related hardware. The program can be stored in a computer-readable storage medium. The program, when executed, may include the procedures in the above method embodiments. The storage medium may be a magnetic disk, an optical disc, a read-only memory (ROM), or a random access memory (RAM).

Finally, it should be noted that the above embodiments are merely used for illustrating rather than limiting the technical solutions of the present application. Although the present application is described in detail with reference to the foregoing embodiments, those of ordinary skill in the art should understand that the technical solutions specified in the above embodiments can still be modified, or some or all of the technical features therein can be equivalently substituted; and such modifications or substitutions do not make the essence of the corresponding technical solutions depart from the scope of the technical solutions of the embodiments of the present application.

What is claimed is:

1. A method, comprising:
   obtaining a motion vector of at least one prediction unit comprised in a first coding tree block currently to be processed, and obtaining a reference frame of a video frame corresponding to the first coding tree block;
   obtaining a video resolution and a video frame rate of a video, and calculating a threshold based on the video resolution and the video frame rate;
   in response to determining that the motion vector is not greater than the threshold according to a preset rule, determining, based on the motion vector, all second coding tree blocks to be referenced by the first coding tree block in the reference frame, wherein the motion vector comprises a value of an abscissa x and a value of an ordinate y, and determining that the motion vector is not greater than the threshold according to the preset rule comprises:
   determining that $a*|x|$ is not greater than the threshold; or
   determining that $a*|y|$ is not greater than the threshold; or
   determining that $a*\sqrt{x^2-y^2}$ is not greater than the threshold,
   wherein a is a preset constant;
   sequentially calculating a first probability that a sample adaptive offset mode is enabled for all coding tree blocks in a preset direction of each of the second coding tree blocks, and
   calculating a second probability that the sample adaptive offset mode is enabled for all coding tree blocks in the preset direction of the first coding tree block; and
   in response to determining that sample adaptive offset modes of all the second coding tree blocks are trusted based on each first probability and the second probability, obtaining the sample adaptive offset modes of all the second coding tree blocks, and using obtained all types of sample adaptive offset modes as sample adaptive offset modes of the first coding tree block, wherein the sample adaptive offset modes of all the second coding tree blocks are trusted in response to determining that at least one first probability is greater than the second probability.

2. The method according to claim 1, further comprising:
   obtaining attribute information of the first coding tree block, the attribute information comprising at least one of: an abscissa and an ordinate of the first coding tree block, and information about a layer in which the video frame corresponding to the first coding tree block is located; and
   in response to determining that the attribute information does not meet a preset condition, performing the step of obtaining a motion vector of at least one prediction unit comprised in a first coding tree block currently to be processed, and obtaining a reference frame of a video frame corresponding to the first coding tree block.

3. The method according to claim 2, wherein the preset condition comprises:
   determining that the abscissa is less than a first preset value; or
   determining that the abscissa is less than a second preset value; or
   determining that the information about the layer indicates a preset layer.

4. The method according to claim 2, further comprising:
   in response to determining that the attribute information meets the preset condition, using all the sample adaptive offset modes as the sample adaptive offset modes of the first coding tree block; or
   in response to determining that the motion vector is greater than the threshold according to the preset rule, using all the sample adaptive offset modes as the sample adaptive offset modes of the first coding tree block; or
   in response to determining, based on each first probability and the second probability, that the sample adaptive offset modes of all the second coding tree blocks are not trusted, using all the sample adaptive offset modes as the sample adaptive offset modes of the first coding tree block.

5. The method according to claim 1, wherein the using the obtained all types of sample adaptive offset modes as sample adaptive offset modes of the first coding tree block comprises:
   adding the obtained sample adaptive offset modes of all the second coding tree blocks to a sample adaptive offset mode list; and
   deleting a repeated sample adaptive offset mode comprised in the sample adaptive offset mode list from the sample adaptive offset mode list, and using a remaining sample adaptive offset mode obtained after the deletion as a sample adaptive offset mode of the first coding tree block.

6. The method according to claim 5, further comprising:
   obtaining a sample adaptive offset mode of a third coding tree block at a preset position relative to the first coding tree block, wherein the preset position comprises at least one of:
   a left position, an upper position, an upper-left corner position, and an upper-right corner position; and
   adding the sample adaptive offset mode of the third coding tree block to the sample adaptive offset mode list.

7. The method according to claim 1, wherein the determining, based on the motion vector, all second coding tree blocks to be referenced by the first coding tree block in the reference frame comprises:
   determining a reference region of the first coding tree block in the reference frame based on the motion vector and a size of the first coding tree block; and
   using a coding tree block overlapping the reference region in coding tree blocks of the reference frame as the second coding tree block.

8. A computer device, comprising a memory, a processor, and computer-readable instructions stored on the memory and capable of running on the processor, wherein when the processor executes the computer-readable instructions, the processor performs operations comprising:

obtaining a motion vector of at least one prediction unit comprised in a first coding tree block currently to be processed, and obtaining a reference frame of a video frame corresponding to the first coding tree block;

obtaining a video resolution and a video frame rate of a video, and calculating a threshold based on the video resolution and the video frame rate;

in response to determining that the motion vector is not greater than the threshold according to a preset rule, determining, based on the motion vector, all second coding tree blocks to be referenced by the first coding tree block in the reference frame, wherein the motion vector comprises a value of an abscissa x and a value of an ordinate y, and determining that the motion vector is not greater the n the threshold according to the preset rule comprises:

determining that a*|x| is not greater than the threshold; or determining that a*|y| is not greater than the threshold; or determining that $a*\sqrt{x^2-y^2}$ is not greater than the threshold, wherein a is a preset constant;

sequentially calculating a first probability that a sample adaptive offset mode is enabled for all coding tree blocks in a preset direction of each of the second coding tree blocks, and calculating a second probability that the sample adaptive offset mode is enabled for all coding tree blocks in the preset direction of the first coding tree block; and in response to determining that sample adaptive offset modes of all the second coding tree blocks are trusted based on each first probability and the second probability, obtaining the sample adaptive offset modes of all the second coding tree blocks, and using obtained all types of sample adaptive offset modes as sample adaptive offset modes of the first coding tree block, wherein the sample adaptive offset modes of all the second coding tree blocks are trusted in response to determining that at least one first probability is greater than the second probability.

9. The computer device according to claim 8, wherein the operations performed by the processor further comprises:

obtaining attribute information of the first coding tree block, the attribute information comprising at least one of: an abscissa and an ordinate of the first coding tree block, and information about a layer in which the video frame corresponding to the first coding tree block is located; and in response to determining that the attribute information does not meet a preset condition, performing the step of obtaining a motion vector of at least one prediction unit comprised in a first coding tree block currently to be processed, and obtaining a reference frame of a video frame corresponding to the first coding tree block.

10. The computer device according to claim 9, wherein the operations performed by the processor further comprises:

in response to determining that the attribute information meets the preset condition, using all the sample adaptive offset modes as the sample adaptive offset modes of the first coding tree block; or in response to determining that the motion vector is greater than the threshold according to the preset rule, using all the sample adaptive offset modes as the sample adaptive offset modes of the first coding tree block; or in response to determining, based on each first probability and the second probability, that the sample adaptive offset modes of all the second coding tree blocks are not trusted, using all the sample adaptive offset modes as the sample adaptive offset modes of the first coding tree block.

11. The computer device according to claim 8, wherein the using the obtained all types of sample adaptive offset modes as sample adaptive offset modes of the first coding tree block comprises:

adding the obtained sample adaptive offset modes of all the second coding tree blocks to a sample adaptive offset mode list; and deleting a repeated sample adaptive offset mode comprised in the sample adaptive offset mode list from the sample adaptive offset mode list, and using a remaining sample adaptive offset mode obtained after the deletion as a sample adaptive offset mode of the first coding tree block.

12. The computer device according to claim 11, wherein the operations performed by the processor further comprises:

obtaining a sample adaptive offset mode of a third coding tree block at a preset position relative to the first coding tree block, wherein the preset position comprises at least one of: a left position, an upper position, an upper-left corner position, and an upper-right corner position; and adding the sample adaptive offset mode of the third coding tree block to the sample adaptive offset mode list.

13. The computer device according to claim 8, wherein the determining, based on the motion vector, all second coding tree blocks to be referenced by the first coding tree block in the reference frame comprises:

determining a reference region of the first coding tree block in the reference frame based on the motion vector and a size of the first coding tree block; and using a coding tree block overlapping the reference region in coding tree blocks of the reference frame as the second coding tree block.

14. A non-transitory computer-readable storage medium having computer-readable instructions stored thereon, when the computer-readable instructions are executed by a processor, the processor performs operations comprising:

obtaining a motion vector of at least one prediction unit comprised in a first coding tree block currently to be processed, and obtaining a reference frame of a video frame corresponding to the first coding tree block;

obtaining a video resolution and a video frame rate of a video, and calculating a threshold based on the video resolution and the video frame rate;

in response to determining that the motion vector is not greater than the threshold according to a preset rule, determining, based on the motion vector, all second coding tree blocks to be referenced by the first coding tree block in the reference frame, wherein the motion vector comprises a value of an abscissa x and a value of an ordinate y, and determining that the motion vector is not greater than the threshold according to the preset rule comprises:

determining that a*|x| is not greater than the threshold; or determining that a*|y| is not greater than n the threshold; or determining that $a*\sqrt{x^2-y^2}$ is not greater than the threshold, wherein a is a preset constant;

sequentially calculating a first probability that a sample adaptive offset mode is enabled for all coding tree blocks in a preset direction of each of the second coding tree blocks, and calculating a second probability that the sample adaptive offset mode is enabled for all coding tree blocks in the preset direction of the first coding tree block; and in response to determining that sample adaptive offset modes of all the second coding tree blocks are trusted based on each first probability and the second probability, obtaining the sample adaptive offset modes of all the second coding tree blocks, and using obtained all types of sample adaptive offset modes as sample adaptive offset modes of the first coding tree block, wherein the sample adaptive offset modes of all the second coding tree blocks are trusted in response to determining that at least one first probability is greater than the second probability.

15. The medium according to claim 14, wherein the operations performed by the processor further comprises:

obtaining attribute information of the first coding tree block, the attribute information comprising at least one of: an abscissa and an ordinate of the first coding tree block, and information about a layer in which the video frame corresponding to the first coding tree block is located; and in response to determining that the attribute information does not meet a preset condition, performing the step of obtaining a motion vector of at least one prediction unit comprised in a first coding tree block currently to be processed, and obtaining a reference frame of a video frame corresponding to the first coding tree block.

16. The medium according to claim 15, wherein the operations performed by the processor further comprises:

in response to determining that the attribute information meets the preset condition, using all the sample adaptive offset modes as the sample adaptive offset modes of the first coding tree block; or in response to determining that the motion vector is greater than the threshold according to the preset rule, using all the sample adaptive offset modes as the sample adaptive offset modes of the first coding tree block; or in response to determining, based on each first probability and the second probability, that the sample adaptive offset modes of all the second coding tree blocks are not trusted, using all the sample adaptive offset modes as the sample adaptive offset modes of the first coding tree block.

17. The medium according to claim 14, wherein the using the obtained all types of sample adaptive offset modes as sample adaptive offset modes of the first coding tree block comprises:

adding the obtained sample adaptive offset modes of all the second coding tree blocks to a sample adaptive offset mode list; and deleting a repeated sample adaptive offset mode comprised in the sample adaptive offset mode list from the sample adaptive offset mode list, and using a remaining sample adaptive offset mode obtained after the deletion as a sample adaptive offset mode of the first coding tree block.

18. The medium according to claim 17, wherein the operations performed by the processor further comprises:

obtaining a sample adaptive offset mode of a third coding tree block at a preset position relative to the first coding tree block, wherein the preset position comprises at least one of: a left position, an upper position, an upper-left corner position, and an upper-right corner position; and adding the sample adaptive offset mode of the third coding tree block to the sample adaptive offset mode list.

19. The medium according to claim 14, wherein the determining, based on the motion vector, all second coding tree blocks to be referenced by the first coding tree block in the reference frame comprises:

determining a reference region of the first coding tree block in the reference frame based on the motion vector and a size of the first coding tree block; and using a coding tree block overlapping the reference region in coding tree blocks of the reference frame as the second coding tree block.

* * * * *